(12) United States Patent
Shigihara et al.

(10) Patent No.: US 11,692,587 B2
(45) Date of Patent: Jul. 4, 2023

(54) BEARING DEVICE, ROTATING MACHINE, AND NOZZLE

(71) Applicant: Mitsubishi Power, Ltd., Yokohama (JP)

(72) Inventors: Takuzo Shigihara, Tokyo (JP); Shuichi Isayama, Tokyo (JP); Chihiro Yoshimine, Tokyo (JP); Shimpei Yokoyama, Tokyo (JP); Yuichiro Waki, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 133 days.

(21) Appl. No.: 17/414,411

(22) PCT Filed: Dec. 17, 2019

(86) PCT No.: PCT/JP2019/049372
§ 371 (c)(1),
(2) Date: Jun. 16, 2021

(87) PCT Pub. No.: WO2020/137688
PCT Pub. Date: Jul. 2, 2020

(65) Prior Publication Data
US 2022/0090625 A1    Mar. 24, 2022

(30) Foreign Application Priority Data

Dec. 28, 2018   (JP) .................................. 2018-248015

(51) Int. Cl.
*F16C 17/03*    (2006.01)
*F16C 33/10*    (2006.01)
*F01D 25/16*    (2006.01)

(52) U.S. Cl.
CPC .............. *F16C 17/03* (2013.01); *F01D 25/16* (2013.01); *F16C 33/106* (2013.01); *F16C 33/108* (2013.01); *F16C 33/1045* (2013.01)

(58) Field of Classification Search
CPC .. F16C 17/03; F16C 33/1025; F16C 33/1045; F16C 33/106; F16C 33/1065; F16C 33/108
See application file for complete search history.

(56) References Cited

U.S. PATENT DOCUMENTS 5,738,447 A * 4/1998 Nicholas ................. F16C 17/03
                                                                384/117
8,123,409 B2 * 2/2012 Waki ....................... F16C 17/03
                                                                 384/418
(Continued)

FOREIGN PATENT DOCUMENTS

JP       58-180815      10/1983
JP       2000-274432    10/2000
(Continued)

OTHER PUBLICATIONS

International Search Report dated Feb. 18, 2020 in corresponding International (PCT) Application No. PCT/JP2019/049372, with English Translation.
(Continued)

*Primary Examiner* — James Pilkington
(74) *Attorney, Agent, or Firm* — Wenderoth, Lind & Ponack, L.L.P.

(57) ABSTRACT

A bearing device includes: a rotary shaft being rotatable around an axis; a bearing pad that supports an outer peripheral surface of the rotary shaft; a nozzle that is disposed on an upstream side of the bearing pad in a rotational direction of the rotation shaft and has a supply hole; a pair of side plates that face the outer circumferential surface of the rotation shaft on an upstream side of the nozzle in the
(Continued)

rotational direction and are disposed on both sides of the nozzle in the axial direction, the pair of side plates having a discharge hole; and a guide surface that faces the upstream side in the rotation direction and extends in the axial direction over an entire length of the bearing pad in the axial direction, wherein the guide surface is circumferentially positioned between the supply hole and the discharge hole.

10 Claims, 6 Drawing Sheets

(56) References Cited

U.S. PATENT DOCUMENTS

| | | | |
|---|---|---|---|
| 10,508,565 B2* | 12/2019 | Shinohara | F16C 33/1045 |
| 10,738,822 B2* | 8/2020 | Shinohara | F16C 17/03 |
| 11,035,404 B2* | 6/2021 | Nakano | F16C 33/10 |

FOREIGN PATENT DOCUMENTS

| | | |
|---|---|---|
| JP | 2012-172729 | 9/2012 |
| JP | 2016-142312 | 8/2016 |
| JP | 2016-145587 | 8/2016 |
| JP | 2017-078476 | 4/2017 |

OTHER PUBLICATIONS

Written Opinion dated Feb. 18, 2020 in corresponding International (PCT) Application No. PCT/JP2019/049372, with English Translation.

* cited by examiner

BEARING DEVICE, ROTATING MACHINE, AND NOZZLE

TECHNICAL FIELD

The present invention relates to a bearing device, a rotating machine, and a nozzle. Priority is claimed on Japanese Patent Application No. 2018-248015 filed on Dec. 28, 2018, the content of which is incorporated herein by reference.

BACKGROUND ART

For example, a bearing device used in a steam turbine, a gas turbine, and a compressor is known (refer to, for example, PTL 1). The bearing device includes a plurality of bearing pads disposed to be spaced apart from each other in a circumferential direction of a rotary shaft. As such a bearing device, a tilting pad bearing is known. In the tilting pad bearing, each bearing pad is supported to be swingable by a pivot (a support) from an outer peripheral side. An oil film of a lubricant supplied from a nozzle is formed at a sliding portion between the rotary shaft and a pad surface.

CITATION LIST

Patent Literature

[PTL 1] Japanese Unexamined Patent Application Publication No. 2017-078476

SUMMARY OF INVENTION

Technical Problem

However, in such a bearing device, some of the lubricant supplied from the nozzle is again supplied to the sliding portion as a carryover oil in some cases via a bearing upper-half portion with the rotation of a rotary shaft. Since air is mixed as a void in such a carryover oil, oil insufficiency occurs at the sliding portion in some cases, and consequently, low frequency vibration occurs.

The present invention is devised in order to solve the problems, and an object thereof is to provide a bearing device, a rotating machine, and a nozzle, which can suppress the occurrence of oil insufficiency at the sliding portion.

Solution to Problem

According to an aspect of the present invention, there is provided a bearing device including a bearing pad that supports an outer peripheral surface of a rotary shaft to be rotatable around an axis of the rotary shaft, a nozzle that is disposed on an upstream side of the bearing pad in a rotation direction of the rotary shaft and has a supply hole through which a lubricant is supplied to the outer peripheral surface of the rotary shaft, a pair of side plates that face the outer peripheral surface of the rotary shaft on an upstream side of the nozzle in the rotation direction and are disposed on both sides of the nozzle in an axis direction, at least one of the pair of side plates having a discharging hole penetrating the one side plate in the axis direction, and a guide surface that faces the upstream side in the rotation direction and extends in the axis direction along the outer peripheral surface of the rotary shaft, at a circumferential position between the supply hole and the discharging hole.

In the configuration, when a carryover oil adhered to the outer peripheral surface of the rotary shaft reaches the guide surface, the guide surface guides the carryover oil in the axis direction. As a result, the carryover oil is discharged to an end portion side of the bearing device in the axis direction via the discharging hole formed in the side plate. Accordingly, it can be suppressed that the carryover oil is again introduced between the bearing pad and the rotary shaft with a lubricant newly supplied from the supply hole of the nozzle.

In the bearing device, the nozzle may extend in the axis direction over the pair of side plates, and the guide surface may be a surface of the nozzle, which faces the upstream side in the rotation direction.

With the configuration, since the guide surface is formed on the nozzle itself, it is not necessary to provide a member forming the guide surface additionally, and thus the number of components can be reduced.

In the bearing device, the nozzle may have a block surface, which is connected to a radial outer side of the guide surface with respect to the rotary shaft and extends on a radial outer side of the discharging hole toward the upstream side in the rotation direction.

With the configuration, a carryover oil that has reached the guide surface can be blocked from the radial outer side by the block surface. For this reason, the carryover oil can be smoothly guided in the axis direction via the guide surface without the carryover oil flowing out carelessly.

In the bearing device, an end portion of the guide surface on the radial inner side may extend toward the upstream side in the rotation direction as going toward the radial inner side.

With the configuration, a carryover oil can be scraped off the outer peripheral surface of a rotary shaft by the end portion of the guide surface on the radial inner side, and be introduced onto the guide surface.

According to another aspect of the present invention, there is provided a rotating machine including the rotary shaft and the bearing device according to any one of the aspects that supports the rotary shaft around the axis.

With the configuration, the rotating machine that can be stably operated can be provided.

According to still another aspect of the present invention, there is provided a nozzle including a nozzle main body that has a facing surface, which faces an outer peripheral surface of a rotary shaft rotating around an axis and in which a supply hole through which a lubricant is discharged is formed, and a guide surface, which is connected to an upstream side of the facing surface in a rotation direction of the rotary shaft and extends toward a radial outer side while facing the upstream side in the rotation direction, and a block body that has a block surface, which is connected to a radial outer side of the guide surface and extends toward the upstream side in the rotation direction while facing a radial inner side.

With the configuration, the facing surface of the nozzle main body faces the rotary shaft. Accordingly, the bearing pad on the upstream side and the bearing pad on the downstream side are separated from each other. For this reason, the high temperature atmosphere around a carryover oil does not reach the bearing pad on the downstream side. As a result, an increase in a possibility that the temperature of the bearing pad on the downstream side rises can be suppressed.

In the nozzle, a supply hole group may be formed by arranging a plurality of the supply holes in an axis direction, and a plurality of the supply hole groups may be provided at an interval in a circumferential direction.

With the configuration, since the plurality of supply hole groups are provided at intervals in the circumferential direction, a larger amount of oil can be stably supplied to the bearing pad. In addition, in a case where an oil supply amount from the nozzle in the related art is insufficient, the insufficiency is supplemented by adding a new nozzle. However, with the configuration, the oil supply amount can be stably secured only by forming the plurality of supply hole groups in one nozzle without adding a nozzle in such a manner.

In the nozzle, a plurality of the supply holes may be disposed to be positioned alternately in a circumferential direction from one side toward the other side in an axis direction.

With the configuration, a larger amount of oil can be stably supplied to the bearing pad since the plurality of supply holes are disposed to be positioned alternately in the circumferential direction.

Advantageous Effects of Invention

With the present invention, the bearing device and the rotating machine, which can suppress the occurrence of oil insufficiency at the sliding portion, can be provided.

DESCRIPTION OF EMBODIMENTS

First Embodiment

Figure 1:
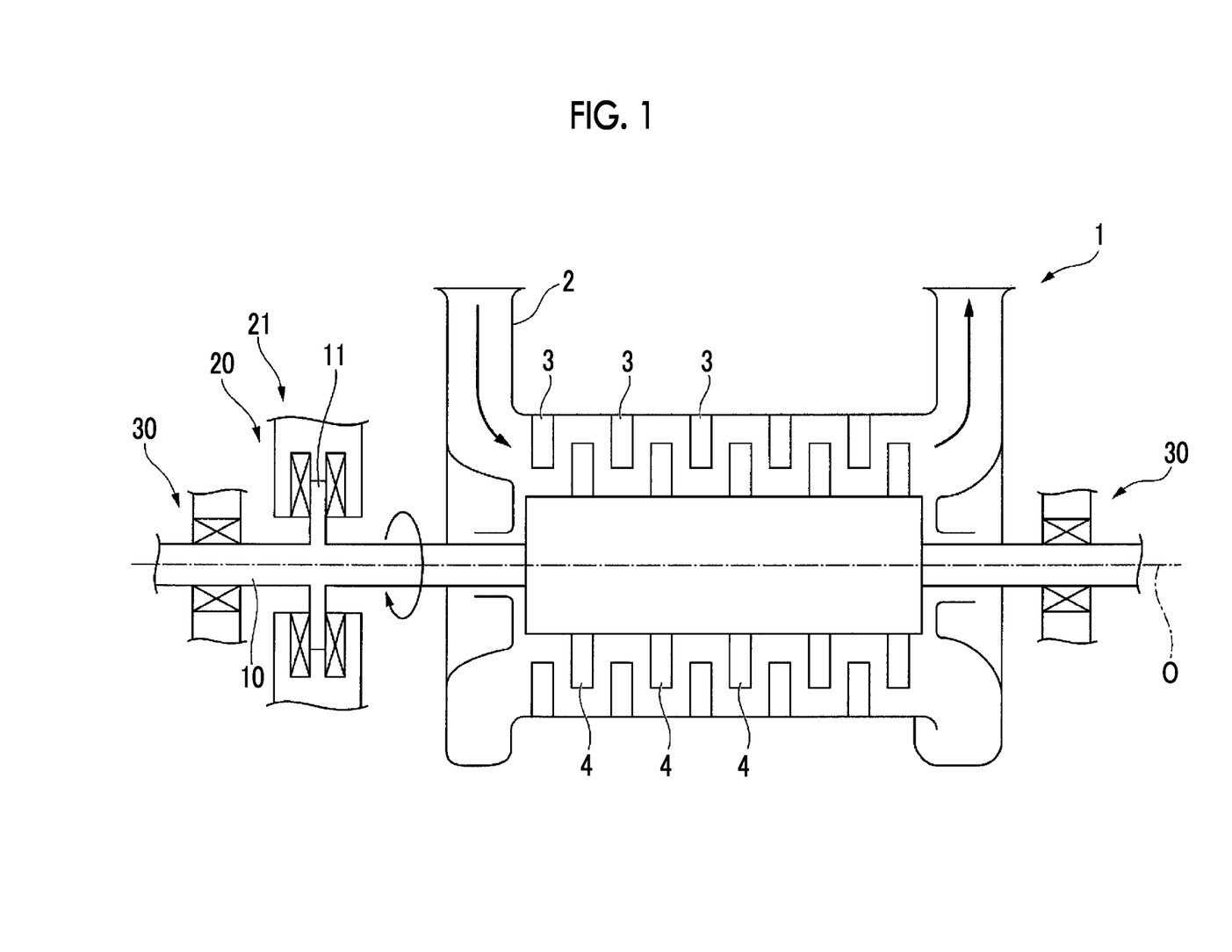
FIG. 1 is a schematic vertical sectional view of a steam turbine including a bearing device according to a first embodiment.

As illustrated in FIG. 1, a steam turbine 1 (rotating machine) according to a first embodiment of the present invention is an external combustion engine that extracts steam energy as rotational power and is used in a generator of a power plant.

The steam turbine 1 includes a turbine casing 2, a rotary shaft 10 that extends along an axis O to penetrate the turbine casing 2, a stator vane 3 that is held by the turbine casing 2, a rotor vane 4 that is provided on the rotary shaft 10, and a bearing portion 20 that supports the rotary shaft 10 to be rotatable around the axis O. The bearing portion 20 includes a thrust bearing 21 and a journal bearing 30, and rotatably supports the rotary shaft 10.

The rotary shaft 10 has a cylindrical shape extending around the axis O. The rotary shaft 10 extends in an axis O direction with respect to the turbine casing 2. A thrust collar 11 is formed on a part of the rotary shaft 10. The thrust collar 11 has a disk shape around the axis O, and integrally projects from a main body of the rotary shaft 10 to a radial outer side of the rotary shaft 10 to form a flange shape. The thrust bearing 21 slidably supports the thrust collar 11 from both sides in the axis O direction.

In such a steam turbine 1, steam introduced in the turbine casing 2 passes through a flow path between the stator vane 3 and the rotor vane 4. At this time, as the steam rotates the rotor vane 4, the rotary shaft 10 rotates with the rotor vane 4, and power (rotational energy) is transmitted to a device such as a generator connected to the rotary shaft 10.

Figure 2:
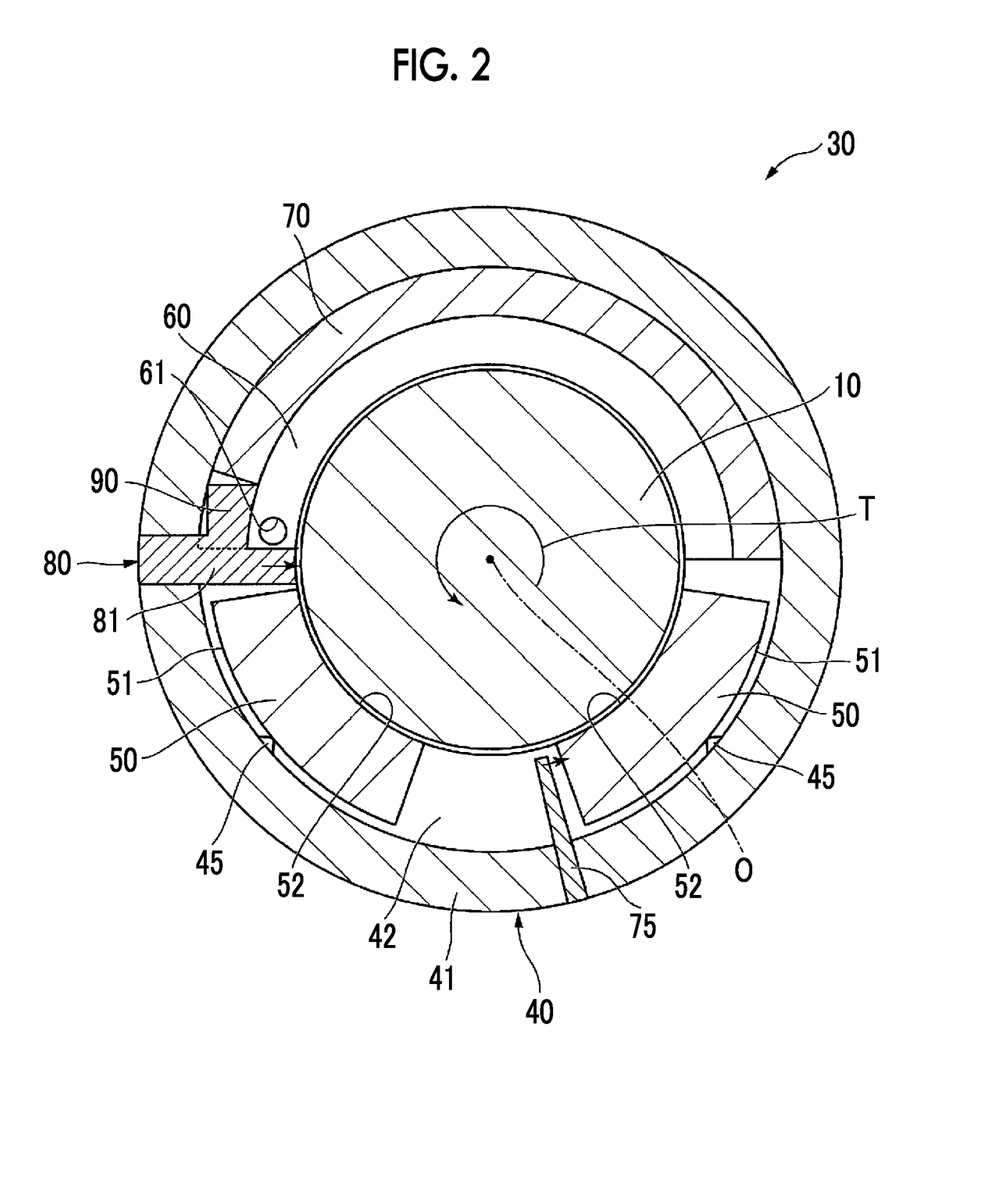
FIG. 2 is a sectional view orthogonal to an axis of the bearing device according to the first embodiment.

Next, the journal bearing 30, which is a bearing device of the present embodiment, will be described with reference to FIG. 2. The journal bearing 30 includes a carrier ring 40, a plurality of pivots 45, a plurality of (two) bearing pads 50, a guide metal 60 (side plate), an upper-half cover 70, a downstream nozzle 75, and an upstream nozzle 80 (nozzle).

The carrier ring 40 covers the rotary shaft 10 from an outer peripheral side by forming an annular shape around the axis O. The carrier ring 40 has a carrier ring main body 41 and a side ring 42. The carrier ring main body 41 covers the rotary shaft 10 from an outer side via a gap with respect to an outer peripheral surface of the rotary shaft 10. The side ring 42 covers the space from both sides of the carrier ring main body 41 in the axis O direction. The side ring 42 has an annular shape around the axis O.

On an inner peripheral surface of the carrier ring main body 41, the plurality of pivots 45 are provided. The pivots 45 are provided in order to support the bearing pads to be described below. Each pivot 45 protrudes from the inner peripheral surface of the carrier ring main body 41 toward a radial inner side with respect to the axis O. Each pivot 45 is gradually tapered from the radial outer side to the radial inner side. In the present embodiment, the two pivots 45 are arranged at an interval in a circumferential direction. More specifically, the pivots are provided at a lower-half portion of the carrier ring main body 41. The lower-half portion herein refers to a region below the axis O in a case where the axis O extends in a horizontal direction.

At circumferential positions on the rotary shaft 10 at an interval in the circumferential direction, which are different from each other, the same number of bearing pads as the pivots 45 are provided to correspond to the pivots 45. In the present embodiment, the two bearing pads 50 and the two pivots 45 are provided. Each bearing pad 50 has an arc shape in a sectional view orthogonal to the axis O of the rotary shaft 10, and has a curved panel shape of which a radial dimension is uniform. An outer peripheral surface of each bearing pad 50, which faces the radial outer side, is a back surface 51 supported by a tip of the pivot 45. The bearing pad 50 is swingable with the tip of the pivot 45 as a fulcrum. Accordingly, a so-called tilting mechanism is configured. The back surface 51 of the bearing pad 50 is in point-contact with the tip of the pivot 45.

An inner peripheral surface of the bearing pad 50 is a pad surface 52 facing the rotary shaft 10. As a lubricant is interposed between the pad surface 52 and the rotary shaft 10, the pad surface 52 slidably supports the outer peripheral surface of the rotary shaft 10 via the lubricant. The pad surface 52 has an arc shape concave to the radial outer side when viewed from the axis O direction, and extends in the axis O direction while maintaining the arc shape. A portion of the bearing pad 50 on the outer peripheral side is a base portion formed of a steel material, and a white metal is laminated on an inner peripheral side of the base portion. The pad surface 52 is formed of a white metal.

The guide metal 60 is fixed to an upper-half portion on the inner peripheral surface of the carrier ring main body 41 via the upper-half cover 70. The guide metal 60 is provided not to support the load of the rotary shaft 10 but to prevent the rotary shaft 10 from flying up. The guide metal 60 is an arc-shaped member extending on the inner peripheral surface of the carrier ring main body 41 in the circumferential direction. The guide metal 60 has an outer peripheral surface fixed to the carrier ring main body 41, and an inner peripheral surface facing the outer peripheral surface of the rotary shaft 10 with a gap. The inner peripheral surface of the guide metal 60 has an arc shape around the axis O when viewed from the axis O direction. As will be described in detail below, two guide metals 60 are provided at an interval in the axis O direction.

As provided on the outer peripheral side of the guide metal 60, the upper-half cover 70 fixes the guide metal 60 to the inner peripheral surface of the carrier ring main body 41. The upper-half cover 70 has an arc shape around the axis O. An end portion of the upper-half cover 70 on a downstream side in a rotation direction T is positioned on an upstream side in the rotation direction T from an end portion of the guide metal 60 on the downstream side in the rotation direction T. That is, at the end portion, a space surrounded by the carrier ring main body 41, the guide metal 60, and the upper-half cover 70 is formed.

The downstream nozzle 75 and the upstream nozzle 80 have a role of supplying a lubricant between the bearing pads 50 and the rotary shaft 10. The downstream nozzle 75 and the upstream nozzle 80 are provided on the upstream side of each bearing pad 50 in the rotation direction T of the rotary shaft 10. The downstream nozzle 75 and the upstream nozzle 80 discharge an externally supplied lubricant toward the downstream side in the rotation direction T.

The upstream nozzle 80 has a nozzle main body 81 and a block body 90. The nozzle main body 81 extends in a radial direction with respect to the axis O. The block body 90 protrudes in the circumferential direction from the upstream side of the nozzle main body 81 in the rotation direction T. The block body 90 is provided in order to fill the space (the space surrounded by the carrier ring main body 41, the guide metal 60, and the upper-half cover 70) described above. In addition, as the upstream nozzle 80 has the block body 90, supply holes 85 to be described below can be formed in a plurality of rows. Thus, a sufficient oil supply amount can also be secured per one upstream nozzle 80.

Figure 3:
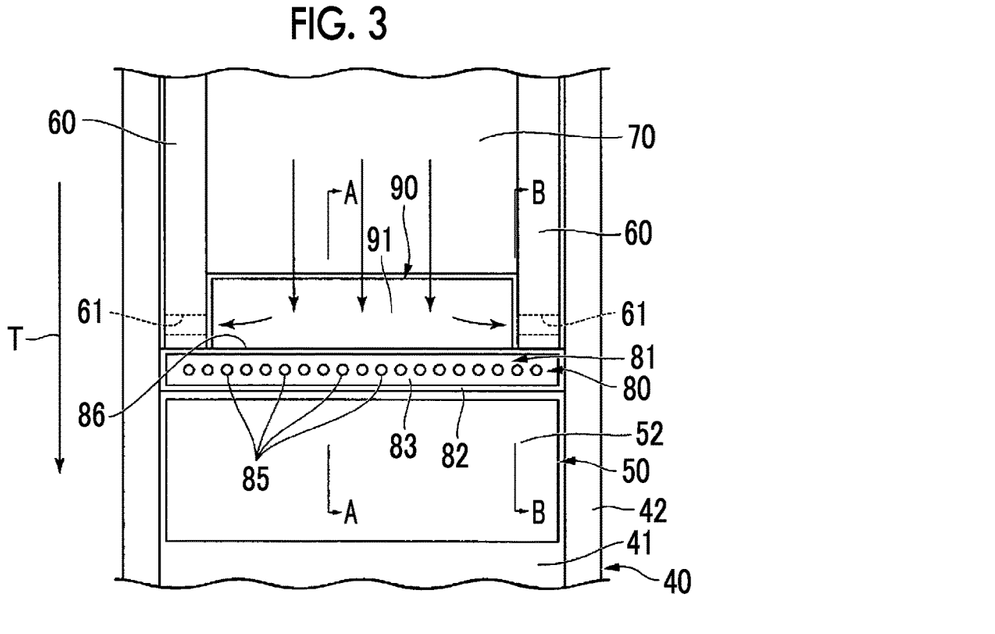
FIG. 3 is a developed view of the bearing device according to the first embodiment when viewed from a radial inner side.
Figure 4:
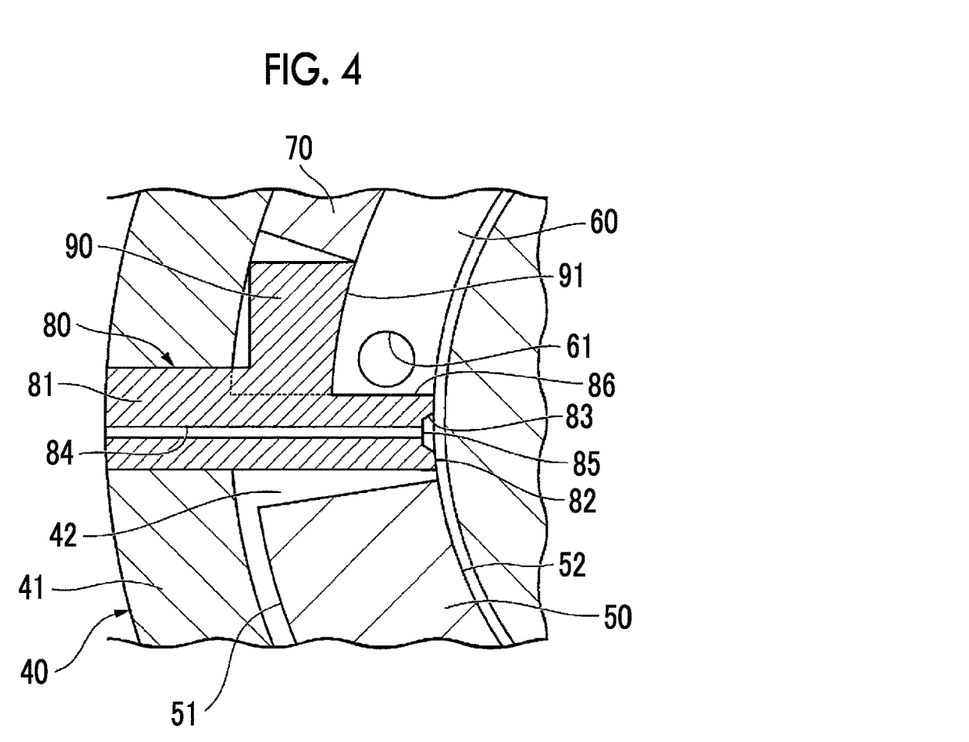
FIG. 4 is a sectional view taken along line A-A of FIG. 3.
Figure 5:
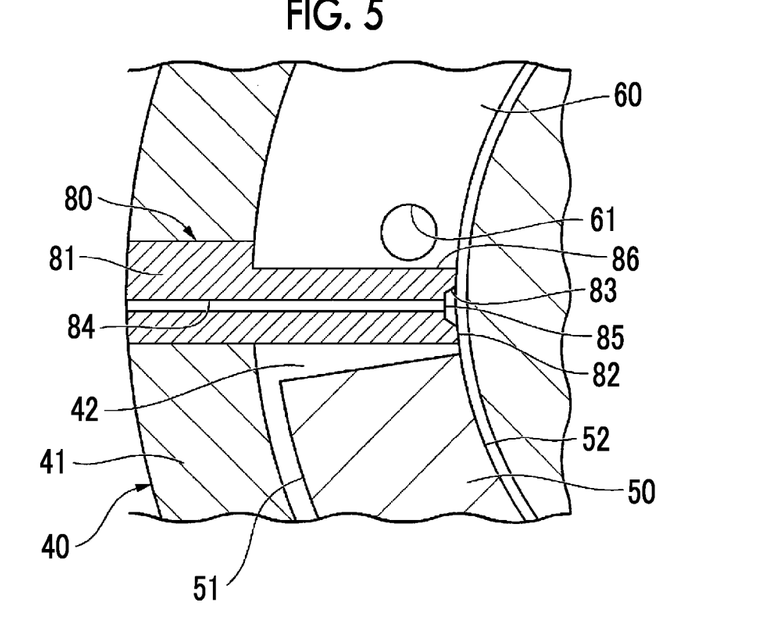
FIG. 5 is a sectional view taken along line B-B of FIG. 3.

As illustrated in FIGS. 3 to 5, the nozzle main body 81 extends from the side ring 42 on one side to the side ring 42 on the other side in the axis O direction. That is, the nozzle main body 81 faces the guide metal 60 from the downstream side. A surface of the nozzle main body 81, which faces the radial inner side, is a facing surface 82 facing the outer peripheral surface of the rotary shaft 10. A concave part 83 which is concave toward the radial outer side is formed in the facing surface 82. Further, the plurality of supply holes 85, which are arranged at intervals in the axis O direction, are formed in a bottom surface (a surface on the radial outer side) of the concave part 83. Each supply hole 85 communicates with an internal flow path 84 (refer to FIG. 4) formed inside the nozzle main body 81. A lubricant introduced through the internal flow path 84 is discharged toward the outer peripheral surface of the rotary shaft 10 via the supply hole 85.

A surface of the nozzle main body 81, which faces the upstream side in the rotation direction T, is a guide surface 86. An edge of the guide surface 86 on the radial outer side is connected to an edge of an inner peripheral surface (a block surface 91) of the block body 90 on the downstream side in the rotation direction T. The block surface 91 extends toward the upstream side in the rotation direction T.

A discharging hole 61 penetrating the guide metal 60 in the axis O direction is formed at a position on the guide metal 60, which overlaps the block body 90 in the circumferential direction. The discharging hole 61 may be formed in at least one of the two (a pair of) guide metals 60. In the present embodiment, an example in which the discharging hole 61 is formed in both of the pair of guide metals 60 is described. Each discharging hole 61 is open to the upstream side in the rotation direction T from the guide surface 86 of the nozzle main body 81.

Next, an operation of the journal bearing 30 according to the present embodiment will be described. When the rotary shaft 10 rotates with the operation of the steam turbine 1, a lubricant is supplied between the rotary shaft 10 and the bearing pads 50 by the downstream nozzle 75 and the upstream nozzle 80. The lubricant forms an oil film between the outer peripheral surface of the rotary shaft 10 and the pad surfaces 52 of the bearing pads 50. The oil film slidably supports the rotary shaft 10 on the pad surfaces 52.

Herein, in the journal bearing 30, the bearing pads 50 are provided only on a lower-half side. Therefore, some of a lubricant supplied from the downstream nozzle 75 and the upstream nozzle 80 is supplied again onto the pad surfaces 52 as a carryover oil via an upper-half portion of the journal bearing 30 with the rotation of the rotary shaft 10. Since air is mixed as a void in such a carryover oil, there is a possibility that oil insufficiency occurs on the pad surfaces 52 in some cases. As a result, there is a possibility that low frequency vibration occurs in the rotary shaft 10.

In the journal bearing 30 according to the present embodiment, the guide surface 86 is formed on the nozzle main body 81 of the upstream nozzle 80 as described above, and the discharging hole 61 is formed in the guide metal 60. Accordingly, when a carryover oil adhered to the outer peripheral surface of the rotary shaft 10 reaches the guide surface 86, the guide surface 86 guides the carryover oil to be spread on both sides in the axis O direction. As a result, the carryover oil is discharged to an end portion side of the journal bearing 30 in the axis O direction via the discharging hole 61 formed in the guide metal 60. Accordingly, it can be suppressed that the carryover oil is again introduced between the bearing pads 50 and the rotary shaft 10 with a lubricant newly supplied from the supply holes 85 of the nozzle.

Further, with the configuration, since the guide surface 86 is formed on the nozzle main body 81 itself, it is not necessary to provide a member forming the guide surface 86 additionally, and thus the number of components can be reduced.

In addition, with the configuration, a carryover oil that has reached the guide surface 86 can be blocked from the radial outer side by the block surface 91. For this reason, the carryover oil can be smoothly guided in the axis direction via the guide surface 86 without the carryover oil flowing out carelessly.

Furthermore, with the configuration, the facing surface 82 of the nozzle main body 81 faces the rotary shaft 10. Accordingly, the bearing pad 50 on the upstream side and the bearing pad 50 on the downstream side are separated from each other. For this reason, the high temperature atmosphere around a carryover oil flowed out from the bearing pad 50 on the upstream side does not reach the bearing pad 50 on the downstream side. As a result, an increase in a possibility that the temperature of the bearing pad 50 on the downstream side rises can be suppressed.

The first embodiment of the present invention has been described hereinbefore. It is possible to make various changes and improvements in the configurations and the method without departing from the spirit of the present invention.

Second Embodiment

Figure 6:
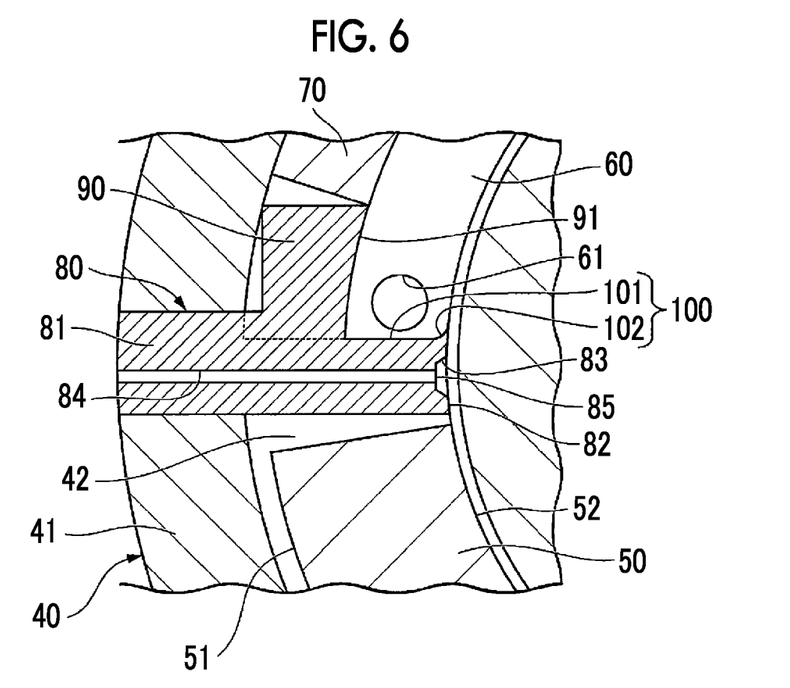
FIG. 6 is a sectional view orthogonal to an axis of a main part of a bearing device according to a second embodiment.

Next, a second embodiment of the present invention will be described with reference to FIG. 6. The same configurations as the first embodiment will be assigned with the same reference signs, and detailed description thereof will be omitted. As illustrated in FIG. 6, in the present embodiment, a guide surface 100 of the nozzle main body 81 has a flat section 101 and a scraping section 102. When viewed from the axis O direction, the flat section 101 extends in the radial direction with respect to the axis O. An edge of the flat section 101 on the radial outer side is connected to the edge of the block surface 91 on the downstream side in the rotation direction T. On the other hand, the scraping section 102, which is an end portion of the guide surface 100 on the radial inner side, extends toward the upstream side in the rotation direction T as going toward the radial inner side. That is, the scraping section 102 protrudes to be tapered toward the upstream side in the rotation direction T. An end surface of the scraping section 102 on the radial inner side is curved in an arc shape along a circumferential curved surface formed by the outer peripheral surface of the rotary shaft 10. In addition, an edge of the scraping section 102 on the radial outer side and an edge of the flat section 101 on the radial inner side are connected to each other to form a smooth curved surface.

With the configuration, a carryover oil can be scraped off the outer peripheral surface of the rotary shaft 10 by the end portion of the guide surface 100 on the radial inner side, and be introduced onto the guide surface 100. As a result, the carryover oil can be more actively introduced toward the discharging hole 61. Accordingly, a possibility that the carryover oil is again introduced between the bearing pads 50 and the rotary shaft 10 with a lubricant newly supplied from the supply holes 85 of the nozzle can be further reduced.

The second embodiment of the present invention has been described hereinbefore. It is possible to make various changes and improvements in the configurations and the method without departing from the spirit of the present invention.

Third Embodiment

Figure 7:
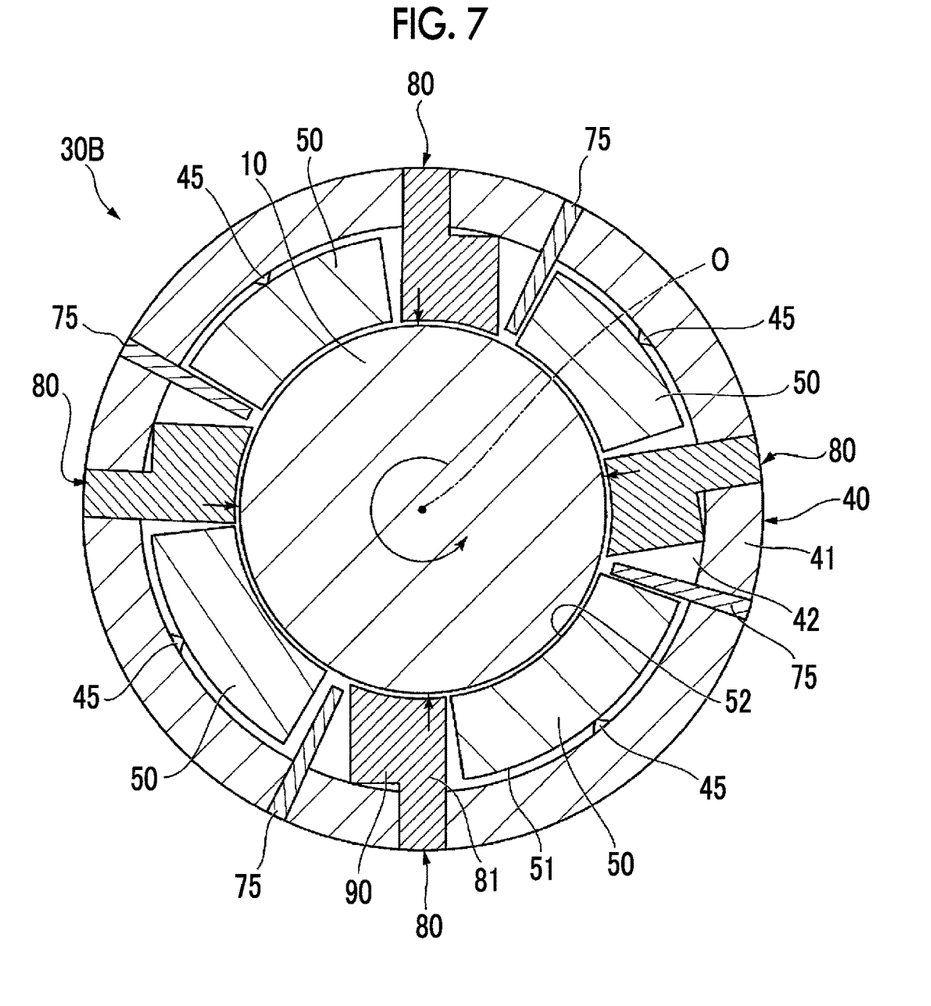
FIG. 7 is a sectional view orthogonal to an axis of a bearing device according to a third embodiment.

Next, a third embodiment of the present invention will be described with reference to FIG. 7. The same configurations as the first embodiment will be assigned with the same reference signs, and detailed description thereof will be omitted. As illustrated in FIG. 7, a journal bearing 30B according to the present embodiment is different from each embodiment in that four bearing pads 50 and four pivots 45 supporting the bearing pads, which are described above, are provided. That is, in the present embodiment, the four bearing pads 50 are arranged at intervals in the circumferential direction. Each upstream nozzle 80 described above is provided on the upstream side of each bearing pad 50. In addition, each downstream nozzle 75 is provided on the downstream side of each bearing pad 50.

With the configuration, in addition to effects described in each embodiment described above, a load by the rotary shaft 10 can be stably supported in a wider range in the circumferential direction since the journal bearing 30B includes the four bearing pads 50. In addition, since the upstream nozzle 80 and the downstream nozzle 75 are provided for each bearing pad 50, a lubricant can be stably supplied to each bearing pad 50.

The third embodiment of the present invention has been described hereinbefore. It is possible to make various changes and improvements in the configurations and the method without departing from the spirit of the present invention.

For example, an example in which the upstream nozzle is disposed on the downstream side of the downstream nozzle 75 has been described in the third embodiment. However, in order to avoid an effect of a carryover oil discharged from the bearing pad 50 on the upstream side, it is also possible to adopt a configuration where the upstream nozzle 80 is provided on the upstream side of the downstream nozzle 75.

In addition, in a case of making improvements on an established bearing device of the related art, it is also possible to adopt a configuration where only some of a plurality of existing nozzles are changed into the upstream nozzle 80 (a block type nozzle) described above. With this configuration as well, the same effects described above can be obtained.

Figure 8:
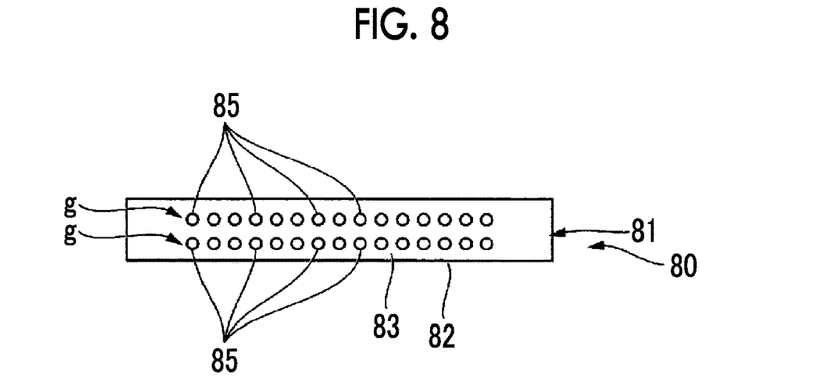
FIG. 8 is a view illustrating a configuration of a nozzle according to a modification example of each embodiment.
Figure 9:
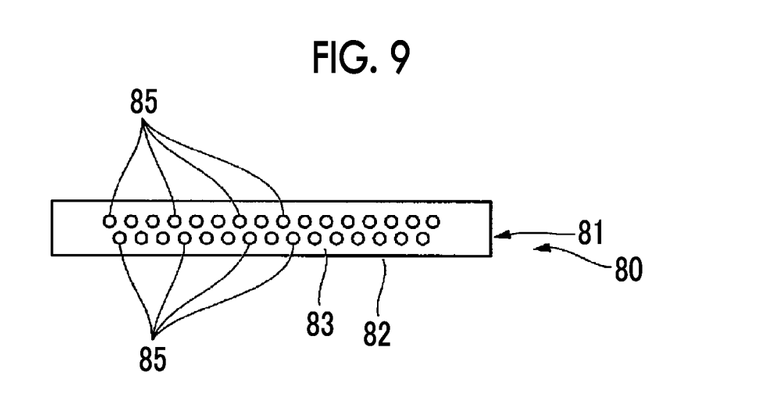
FIG. 9 is a view illustrating a configuration of a nozzle according to another modification example of each embodiment.

In addition, it is also possible to adopt configurations illustrated in FIGS. 8 and 9 as a modification example common to the respective embodiments. In the example of FIG. 8, one supply hole group g is formed by arranging the plurality of supply holes 85 in the axis direction, and a plurality of supply hole groups g are provided at intervals in the circumferential direction. Although a configuration where two supply hole groups g are provided is illustrated in the example of FIG. 8, it is also possible to adopt a configuration where three or more supply hole groups g are provided.

With the configuration, since the plurality of supply hole groups g are provided at intervals in the circumferential direction, a larger amount of oil can be stably supplied to the bearing pads 50. In addition, in a case where an oil supply amount from the nozzle in the related art is insufficient, the insufficiency is supplemented by adding a new nozzle. However, with the configuration, the oil supply amount can be stably secured only by forming the plurality of supply hole groups g in one nozzle (the upstream nozzle 80) without adding a nozzle in such a manner.

Further, in the example of FIG. 9, the plurality of supply holes 85 are disposed to be positioned alternately in the circumferential direction from one side toward the other side in the axis O direction. In other words, in the example of FIG. 9, the plurality of supply holes 85 are arranged in a zigzag pattern (staggered).

With the configuration, a larger amount of oil can be stably supplied to the bearing pads 50 since the plurality of supply holes 85 are disposed to be positioned alternately in the circumferential direction.

In each embodiment, the upstream nozzle 80 has been described as an application target of the present invention. However, it is also possible that the downstream nozzle 75 is the application target. In this case, the guide metal is not provided on both sides of the downstream nozzle 75 in the axis O direction. Thus, it is desirable to adopt a configuration where the discharging hole is formed in the side ring 42 of the carrier ring 40 and a carryover oil is discharged to the outside from the discharging hole.

In addition, an example in which the guide surface 86 is formed on the nozzle main body 81 has been described in each embodiment. However, it is also possible to adopt a configuration where a member having the guide surface 86 is provided separately from the nozzle main body 81 and a carryover oil is guided by the member.

Furthermore, an example in which the journal bearings 30 and 30B include two and four bearing pads 50 respectively has been described in each embodiment. However, the number of bearing pads 50 is not limited thereto, and it is also possible to adopt, for example, a configuration where three or five or more bearing pads 50 are included. In addition, it is also possible to adopt a configuration where a plurality of upstream nozzles 80 described above are provided at an interval in the circumferential direction between the bearing pads 50 adjacent to each other.

Further, an example in which the journal bearing 30 is applied to the steam turbine 1, which is a rotating machine, has been described in each embodiment. However, a specific example of the rotating machine is not limited to the steam turbine 1, and it is also possible to apply the journal bearing 30 to other devices including a gas turbine and a compressor.

With the bearing device, the occurrence of oil insufficiency at a sliding portion can be suppressed.

REFERENCE SIGNS LIST

1: steam turbine
2: turbine casing
3: stator vane
4: rotor vane
10: rotary shaft
11: thrust collar
20: bearing portion
21: thrust bearing
30: journal bearing (bearing device)
40: carrier ring
41: carrier ring main body
42: side ring
45: pivot
50: bearing pad
51: back surface
52: pad surface
60: guide metal (side plate)
61: discharging hole
70: upper-half cover
75: downstream nozzle
80: upstream nozzle
81: nozzle main body
82: facing surface
83: concave part
84: internal flow path
85: supply hole
86: guide surface
90: block body
91: block surface
100: guide surface
101: flat section
102: scraping section
O: axis
T: rotation direction

The invention claimed is:

1. A bearing device comprising:
a rotary shaft having an axis extending in an axial direction and the rotary shaft being rotatable around the axis;
a bearing pad that supports an outer peripheral surface of the rotary shaft;
a nozzle that is disposed upstream of the bearing pad relative to a rotation direction of the rotary shaft and has a supply hole through which a lubricant is supplied to the outer peripheral surface of the rotary shaft;
a pair of side plates that face the outer peripheral surface of the rotary shaft, the pair of side plates being disposed upstream of the nozzle relative to the rotation direction and being disposed on both sides of the nozzle in the axial direction, at least one side plate of the pair of side plates having a discharging hole penetrating the at least one side plate in the axial direction; and
a guide surface that faces upstream relative to the rotation direction and extends in the axial direction over an entire length of the bearing pad in the axial direction, wherein the guide surface is circumferentially positioned between the supply hole and the discharging hole.

2. The bearing device according to claim 1,
wherein the nozzle extends in the axial direction over the pair of side plates, and
the guide surface is a surface of the nozzle, which faces upstream relative to the rotation direction.

3. The bearing device according to claim 2,
wherein the nozzle has a block surface, which is connected to a radial outer side of the guide surface with respect to the rotary shaft and extends upstream relative to the rotation direction on a radial outer side of the discharging hole.

4. The bearing device according to claim 1,
wherein an end portion at a radially inner side of the guide surface extends upstream relative to the rotation direction.

5. A rotating machine comprising a bearing device according to claim 1.

6. A nozzle comprising:
a nozzle main body that has
a facing surface which faces an outer peripheral surface of a rotary shaft rotating around an axis, and in which a supply hole is formed through which a lubricant is discharged, and
a guide surface which is connected to an upstream side of the facing surface relative to a rotation direction of the rotary shaft and extends toward a radial outer side while facing upstream relative to the rotation direction; and
a block body that has a block surface, which is connected to a radial outer side of the guide surface and extends upstream relative to the rotation direction while facing a radially inward direction,
wherein a supply hole group is formed by arranging a plurality of the supply holes in an axial direction of the rotary shaft, and
a plurality of the supply hole groups are provided at an interval in a circumferential direction.

7. A nozzle comprising:
a nozzle main body that has
a facing surface which faces an outer peripheral surface of a rotary shaft rotating around an axis, and in which a supply hole is formed through which a lubricant is discharged, and
a guide surface which is connected to an upstream side of the facing surface relative to a rotation direction of the rotary shaft and extends toward a radial outer side while facing upstream relative to the rotation direction; and a block body that has a block surface, which is connected to a radial outer side of the guide surface and extends upstream relative to the rotation direction while facing a radially inward direction, wherein a plurality of the supply holes are disposed to be positioned alternately in a circumferential direction from one side toward the other side in an axial direction of the rotary shaft.

8. A bearing device comprising:

a rotary shaft having an axis extending in an axial direction and the rotary shaft being rotatable around the axis;

a bearing pad that supports an outer peripheral surface of the rotary shaft;

a nozzle that is disposed upstream of the bearing pad relative to a rotation direction of the rotary shaft and has a supply hole through which a lubricant is supplied to the outer peripheral surface of the rotary shaft;

a pair of side plates that face the outer peripheral surface of the rotary shaft, the pair of side plates being disposed upstream of the nozzle relative to the rotation direction and being disposed on both sides of the nozzle in the axial direction, at least one side plate of the pair of side plates having a discharging hole penetrating the at least one side plate in the axis direction; and a guide surface that faces upstream relative to the rotation direction and extends in the axial direction over an entire length of the bearing pad in the axial direction, wherein the guide surface is circumferentially positioned between the supply hole and the discharging hole, the nozzle extends in the axial direction over the pair of side plates, the guide surface is a surface of the nozzle, which faces upstream relative to the rotation direction, the nozzle has a block surface, which is connected to a radial outer end of the guide surface with respect to the rotary shaft, and extends upstream relative to the rotation direction from the radial outer end of the guide surface and along a radial outer side of the discharging hole, and the discharging hole is located within a region surrounded by the guide surface, the block surface and an outer circumference of the rotary shaft, when viewed from the axial direction.

9. The bearing device according to claim 8, wherein an end portion at a radially inner side of the guide surface extends upstream relative to the rotation direction.

10. A rotating machine comprising a bearing device according to claim 8.

* * * * *